US007545062B2

(12) United States Patent
Foshage

(10) Patent No.: US 7,545,062 B2
(45) Date of Patent: Jun. 9, 2009

(54) DEVICES AND SYSTEMS FOR COOLING INSULATED, STRIP-LAMINATED STRUCTURES BY CONVECTION

(75) Inventor: Jerry Foshage, Boxford, MA (US)

(73) Assignee: Satcon Technology Corporation, Boston, MA (US)

( * ) Notice: Subject to any disclaimer, the term of this patent is extended or adjusted under 35 U.S.C. 154(b) by 603 days.

(21) Appl. No.: 11/441,991

(22) Filed: May 26, 2006

(65) Prior Publication Data

US 2007/0273230 A1 Nov. 29, 2007

(51) Int. Cl.
*H02K 9/02* (2006.01)
*H01F 27/08* (2006.01)

(52) U.S. Cl. .......................... 310/65; 310/90.5; 310/52; 336/60; 335/300

(58) Field of Classification Search .................. 310/52, 310/58, 59, 65, 90.5; 336/57-61; 335/300
See application file for complete search history.

(56) References Cited

U.S. PATENT DOCUMENTS 1,236,675 A * 8/1917 Chubb ......................... 307/11
1,317,003 A * 9/1919 Kustom et al. ................ 336/60
1,623,345 A * 4/1927 Hopkins ...................... 336/61
3,056,071 A * 9/1962 Baker et al. ................. 335/300
3,295,082 A * 12/1966 Kustom et al. .............. 335/299
2007/0273230 A1* 11/2007 Foshage .................... 310/90.5

FOREIGN PATENT DOCUMENTS

JP 56051813 A * 5/1981
JP 01196802 A * 8/1989

* cited by examiner

*Primary Examiner*—Quyen Leung
*Assistant Examiner*—David W. Scheuermann
(74) *Attorney, Agent, or Firm*—Weingarten, Schurgin, Gagnebin & Lebovici LLP

(57) ABSTRACT

A device and system for removing heat from a magnetic device such as an electromagnet core section of a magnetic bearing internally by convection. The device includes a ribbon-type conductor portion and an insulator portion that are spirally and coaxially arranged on a coil. The insulating portion includes window portions that provide a fluid passage when the insulating portion is sandwiched between adjacent conductor portions. The device can be disposed in a plenum in the electromagnet core section and at least one opening in the core section, through which a cooling fluid can be introduced into the plenum, can be provided.

7 Claims, 4 Drawing Sheets

DEVICES AND SYSTEMS FOR COOLING INSULATED, STRIP-LAMINATED STRUCTURES BY CONVECTION

STATEMENT REGARDING FEDERALLY SPONSORED RESEARCH OR DEVELOPMENT

The United States Government has a paid-up license in this invention and the right in limited circumstances to require the patent owner to license others on reasonable terms as provided for by the terms of Contract Number FA8650-04-C-2493 awarded by the U.S. Air Force Research Laboratory.

CROSS REFERENCE TO RELATED APPLICATIONS

N/A

BACKGROUND OF THE INVENTION

Devices and systems for cooling a magnetic device by convective fluid flow are disclosed and, more particularly, devices, systems, and methods using a strip-laminated, ribbon-type conductor having an insulating portion that is structured and arranged, spirally and coaxially, with the ribbon-type conductor so that the insulating portion is disposed between adjacent conductor sections.

Design of magnetic devices, e.g., electromagnet coils for magnetic bearings, has included laminated coils and/or laminated cores. However, resistive losses and core losses resulting from eddy currents and/or hysteresis, and electrical conduction losses produce relatively-high, internal heat, requiring cooling to maintain material temperatures within acceptable operating limits.

Potted structures such as coils made with round conductors and insulated and/or encapsulated in an epoxy or ceramic, offer desirable properties such as protection from oxidation, insulation resistance in a high-temperature environment, i.e., greater than 200 degrees Centigrade (° C.), and improved dielectric strength in a high-temperature environment. However, potted structures, typically, transfer heat by conduction, which makes heat removal less than ideal and have low packing factor.

In one electromagnet coil application, mica insulation was disposed between wound layers of nickel-plated copper strips. However, over time, at operating temperatures in excess of 500° C., nickel diffusion degraded the conductivity of the copper and the effectiveness of heat transfer was limited. Accordingly, it would be desirable to provide a system and a device for cooling magnetic devices, e.g., electromagnet coils.

It also would be desirable to provide a system and a device for cooling magnetic devices for an electromagnet coil having a high packing factor, e.g., 75 to 80 percent.

It would further be desirable to provide a system and a device for cooling magnetic devices that reduce short- and long-term degradation of conductivity at elevated temperatures.

It would also be desirable to provide a system and a device for cooling magnetic bearing coils, inductor coils, inductor cores, shaker field cores, and the like.

BRIEF SUMMARY OF THE INVENTION

These and other advantages can be recognized using a system and a device in accordance with the present invention for removing heat from a magnetic device by convection. The magnetic device can be an electromagnet core section for a magnetic bearing coil. The core section includes an electrically conducting coil and a heat-removal device. The electrically conducting coil can include a plenum into which the heat-removal device can be disposed.

The heat-removal device includes a ribbon-type conductor portion and an insulator portion. The ribbon-type conductor portion is made from a highly conductive material, e.g., chrome-plated copper or anodized aluminum, to conduct heat away from the electrically conducting coil. More particularly, the conductor is structured and arranged spirally in a coil and the insulator portion is arranged spirally and coaxially with the conductor so that a section of the insulator portion is interposed between adjacent sections of the conductor portion in the coil. The insulator portion is made from an insulating material to provide a mechanical offset between adjacent segments of the conductor portion and to provide a fluid path for removing heat from the conductor portion by convection. The insulator portion includes a plurality of window portions and a plurality of strip sections. The strip portions separate adjacent window portions. Thus, when the insulator portion is sandwiched between adjacent conductor portion segments, a passage for fluid flow is provided.

BRIEF DESCRIPTION OF THE SEVERAL VIEWS OF THE DRAWINGS

The foregoing and other objects, features, and advantages of the invention will be apparent from the following Detailed Description of the Invention in conjunction with the Drawings of which.

DETAILED DESCRIPTION OF THE INVENTION

Figure 1A:
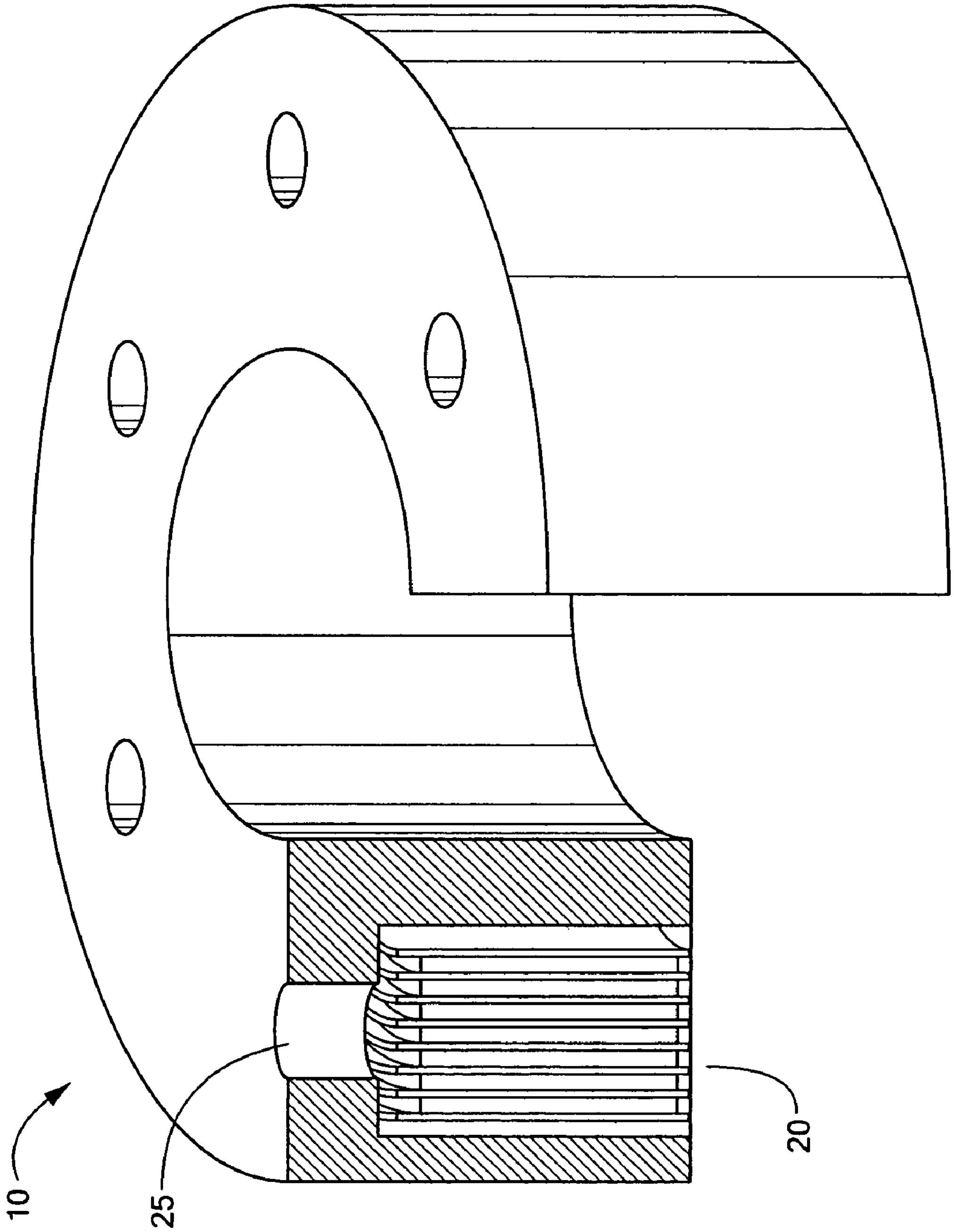
FIG. 1A is an isometric view of an encapsulated electromagnetic core section for a magnetic bearing coil.
Figure 1B:
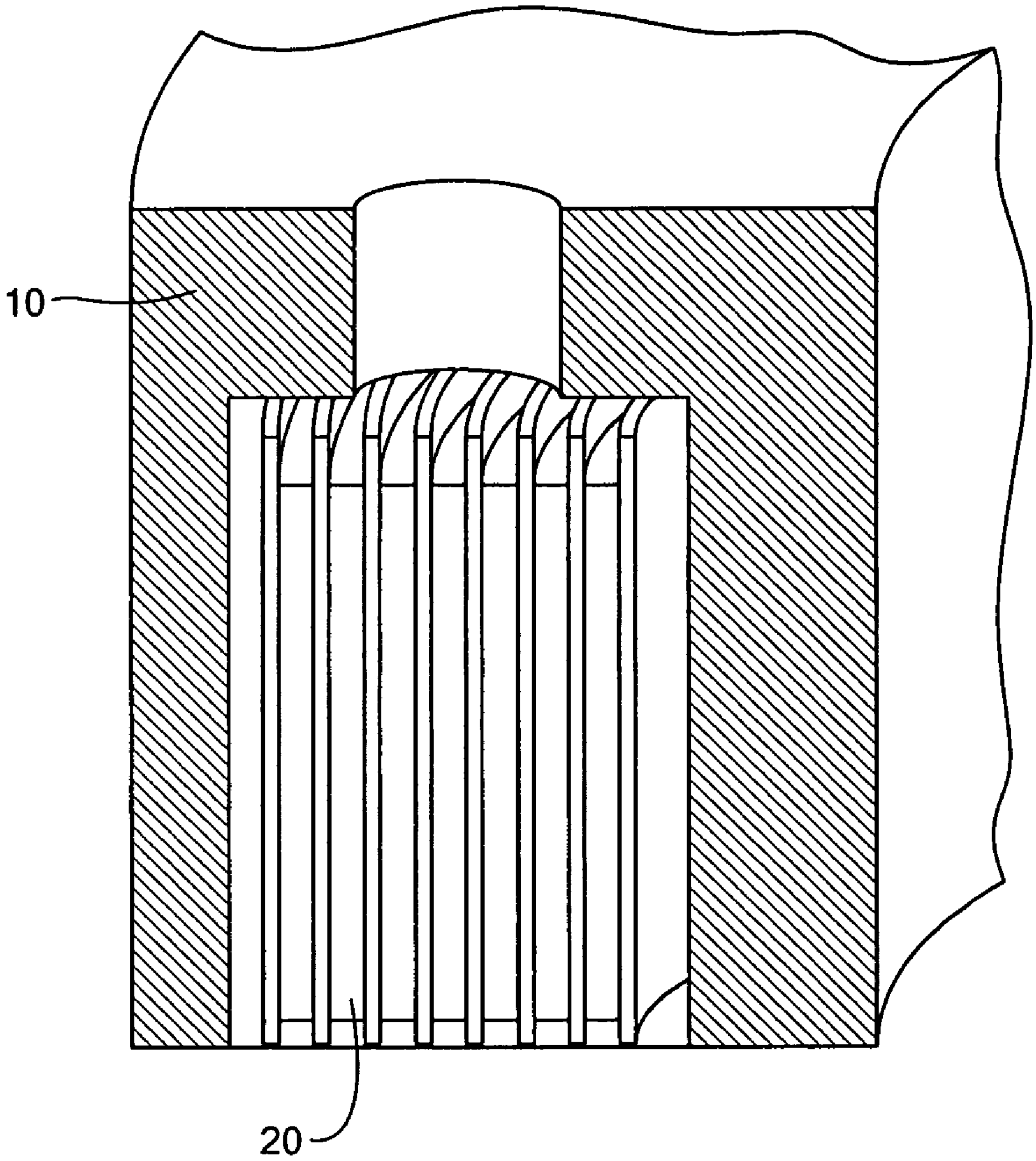
FIG. 1B is an enlargement of a section from the view of an electromagnetic core section for a magnetic bearing coil in FIG. 1A.
Figure 2:
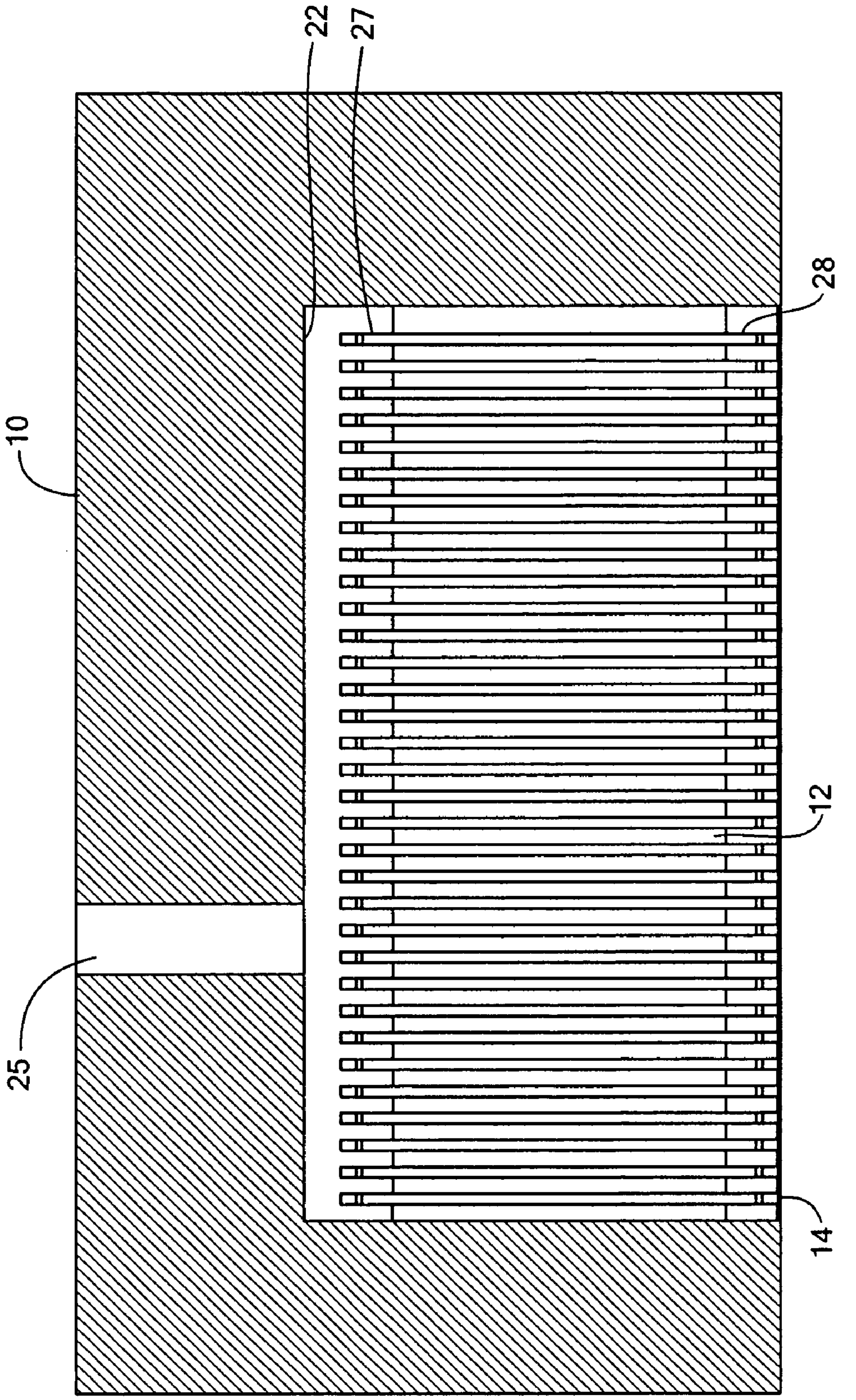
FIG. 2 is a cross-sectional view of an electromagnetic core section for a magnetic bearing coil.

Referring to FIGS. 1A, 1B, and 2, there is shown a magnetic device, e.g., an electromagnet core section 10 for a magnetic bearing coil (not shown), that is internally cooled by convection. The electromagnet core section 10 includes an enclosed internal heat-removal device 20 for long-term, high-temperature operation.

The heat-removal device 20 is structured and arranged, concentrically and coaxially, in a plenum 22 that is provided in the core section 10. The heat-removal device 20 includes a ribbon-type conductor portion 12, for transferring heat by convection, and an insulating portion 14, e.g., an insulating ribbon, that mechanically offsets and electrically insulates adjacent segments of the conductor portion 12. Moreover, the insulating portion 14 provides fluid passages 15 to remove heat from the conductor portion 12 by convection.

The ribbon-type conductor portion 12 can be made of any material or combination of materials that provides relatively-high electrical conductivity and resistance to degradation at high operating temperatures. Advantageously, the outer surface of the material for the ribbon-type conductor portion 12 can be insulated and/or passivated, e.g., anodized, plated, and the like, to provide a diffusion barrier and corrosion resistance, to provide added dielectric strength, and to provide further electrical insulation with minimal thermal insulation. Alternatively, the outer surface of the conductor portion 12 material can be coated, e.g., with a protective ceramic coating, to prevent high-temperature degradation of the base material. Accordingly, anodized aluminum and chrome-plated copper are suitable materials for the conductor portion 12. A range of outer surface thicknesses is about 0.0002 to about 0.0005 inches (about 0.2 to 0.5 mils).

The insulating portion 14 can be made from a high-temperature insulating material of natural, e.g., mica or Muscovite, or man-made origin, e.g., polyimides such as Kaptone® manufactured by DuPont Industries of Wilmington, Del. Many factors affect the thickness of the insulated portion 14, e.g., available space in the plenum 22, arcing potential of the conductor portion 12, heat produced in the conductor portion 12, and the like. An insulated portion thickness of about 0.002 inches (2 mils) has been used successfully, recognizing that the thickness is application dependent.

The insulated portion 14 and the ribbon-type conductor portion 12 can each be manufactured and packaged in a spiral or a coil form, e.g., on separate spools (not shown). The free running end of the ribbon-type conductor portion 12 and the free running end of the insulated portion 14 from each spool can be placed one on top of the other and the two portions 12 and 14 can be wound together onto a common fixture, e.g., another spool (not shown). As the two portions 12 and 14 are wound, with every complete revolution of the common fixture, the conductor portion 12 and the insulated portion 14 are inter-layered. Thus, the heat-removal device 20 comprises a coil of spirally-, coaxially-alternating insulated portions 14 and ribbon-type conductor portions 12.

Figure 3:
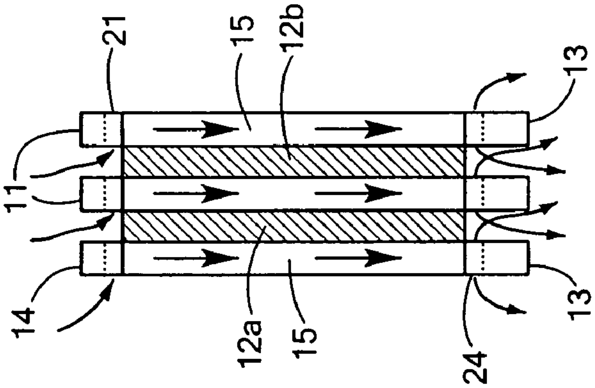
FIG. 3 is a diagram of a cross-section of the conduits formed by the windows in the insulated portion and the conductor portion in accordance with the present invention.
Figure 4:
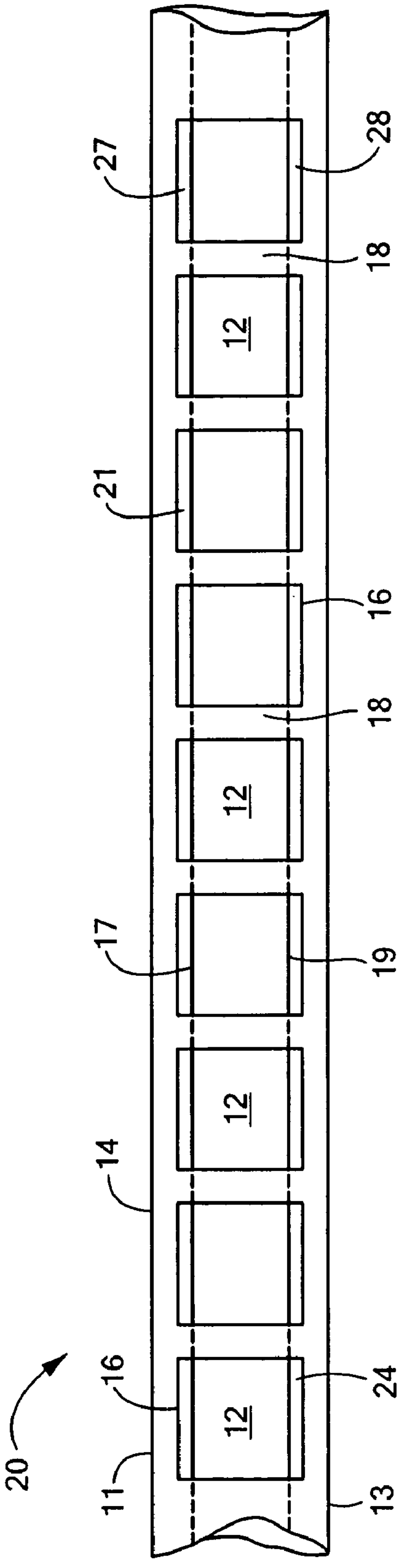
FIG. 4 is a diagram of an insulated portion and conductor portion in accordance with the present invention.

Referring to FIGS. 3 and 4, the insulating portion 14 is perforated to provide a plurality of window sections 16. Adjacent window sections 16 are separated by a strip section 18. Although the window sections 16 shown in FIG. 4 are rectangular in shape, the invention is not to be construed as being limited thereto. Indeed, the window sections 16 can be circular, oval, polygonal, ellipsoid or any other suitable shape.

Strip sections 18 disposed between adjacent window sections 16 on the insulated portion 14 provide the spacing, or mechanical offset, between adjacent conductor sections 12*a* and 12*b*. The perforated, window sections 16 are sandwiched between adjacent conductor portion segments 12*a* and 12*b* to form a passage 15 for natural or forced convective fluid flow. Thus, each window section 16 provides a fluid passage 15 that is defined by the exposed surfaces of adjacent segments of the conductor portion 12*a* and 12*b*. When a cooling fluid is passed through the passage 15, the cooling fluid removes heat from the exposed surfaces of the adjacent segments of the conductor portion 12*a* and 12*b* by convection.

The insulating portion 14 is wider in dimension than the conductor portion 12. More particularly, the positional relationship between the insulated portion 14 and the conductor portion 12 is such that each side 11 and 13 of the insulated portion 14 extends beyond the respective sides 17 and 19 of the conductor portion 12. Furthermore, each window section 16 is wider in dimension than the conductor portion 12 and the positional relationship between each window section 16 and the conductor portion 12 is such that portions of the window section 27 and 28 extend beyond the respective sides 17 and 19 of the ribbon conductor 12 to provide access openings 21 and egress openings 24.

Those skilled in the art will appreciate that the area of the window sections 16, the area of the strip sections 18, and the thickness of the insulator portion 14 can be adjusted to remove a desired amount of heat.

As shown in FIGS. 1A, 1B, and 2, at least one fluid flow opening 25 is/are provided in the core section 10. Each fluid flow opening 25 provides a point of entry for introducing cooling fluids, e.g., gas or air, into the plenum 22 and, moreover, into the plurality of passages 15 in the heat-removal device 20. A convective fluid can flow naturally, e.g., at or near atmospheric pressure, or, alternatively, can be forced under pressure. For example, the convective fluid can flow, successively, through the at least one opening 25 into the plenum 22. From the plenum 22, the fluid passes through the plural access openings 21 in the window sections 16, through the passages 15, and out the egress openings 24. The convective fluid escapes the core section radially through an axial gap (not shown).

It will be apparent to those of ordinary skill in the art that modifications to and variations of the above-described system and method may be made without departing from the inventive concepts described herein. Accordingly, the invention should not be limited except by the scope and spirit of the appended claims.

What is claimed is:

1. A device for removing heat from an electrically conducting coil of a magnetic device by convection, the device comprising:

a ribbon-type conductor portion, having a width, for conducting heat from the magnetic device's electrically conducting coil, the ribbon-type conductor portion being structured and arranged spirally in a coil;

an insulating portion, having a width greater than the width of the conductor portion, that is structured and arranged spirally and coaxially with the ribbon-type conductor portion so that a section of the insulating portion is interposed between adjacent segments of the conductor portion along the length of the coil, the insulating portion including:

a plurality of window portions, each having an opening size that is greater than the width of the conductor portion, to provide a fluid flow passage along each exposed surface of adjacent segments of the conductor portion of the coil, and a plurality of strip sections that separate adjacent window portions from the plurality of window portions for providing a plurality of fluid flow passages between adjacent conductor segments of the conductor portion in the coil.

2. The device as recited in claim 1, wherein the coil is enclosed in a concentric and coaxial plenum provided in the electrically conducting coil.

3. The device as recited in claim 2, wherein the electrically conducting coil includes at least one opening for introducing a fluid into the plenum.

4. The device as recited in claim 1, wherein the ribbon-type conductor is selected from the group comprising of conducting metals, silver, aluminum, anodized aluminum, and chrome-plated copper.

5. The device as recited in claim 1, wherein the insulating portion is made of natural or artificial materials selected from the group comprising mica, Muscovite, and polymides.

6. The device as recited in claim 1, wherein each of the plurality of window portions has a shape selected from the group comprising rectangular, circular, oval, polygonal, and ellipsoid.

7. An electromagnet core section for a magnetic bearing coil, the core section comprising:

an electrically conducting coil having a plenum and at least one opening for introducing a fluid into the plenum; and a device, that is disposed in the plenum of the electrically conducting coil, for removing heat from the electromagnet core section by convection, the heat-removal device comprising:

a ribbon-type conductor portion, having a width, for conducting heat from the magnetic device's electrically conducting coil, the ribbon-type conductor portion being structured and arranged spirally in a coil;

an insulating portion, having a width greater than the width of the conductor portion, that is structured and arranged spirally and coaxially with the ribbon-type conductor portion so that a section of the insulating portion is interposed between adjacent segments of the conductor portion along the length of the coil, the insulating portion including:

a plurality of window portions, each having an opening size that is greater than the width of the conductor portion, to provide a fluid flow passage along each exposed surface of adjacent segments of the conductor portion of the coil, and a plurality of strip sections that separate adjacent window portions from the plurality of window portions, for providing a plurality of fluid flow passages between adjacent conductor segments of the conductor portion in the coil.

* * * * *

UNITED STATES PATENT AND TRADEMARK OFFICE

CERTIFICATE OF CORRECTION

PATENT NO. : 7,545,062 B2
APPLICATION NO. : 11/441991
DATED : June 9, 2003
INVENTOR(S) : Jerry Foshage It is certified that error appears in the above-identified patent and that said Letters Patent is hereby corrected as shown below:

Column 3, line 13, "Kaptone®" should read --Kapton®--.

Signed and Sealed this

Eighth Day of September, 2009

David J. Kappos
*Director of the United States Patent and Trademark Office*